Jan. 22, 1924.
R. R. WISE
1,481,578
CHANGE SPEED TRANSMISSION GEAR
Filed Dec. 19, 1922
2 Sheets-Sheet 1
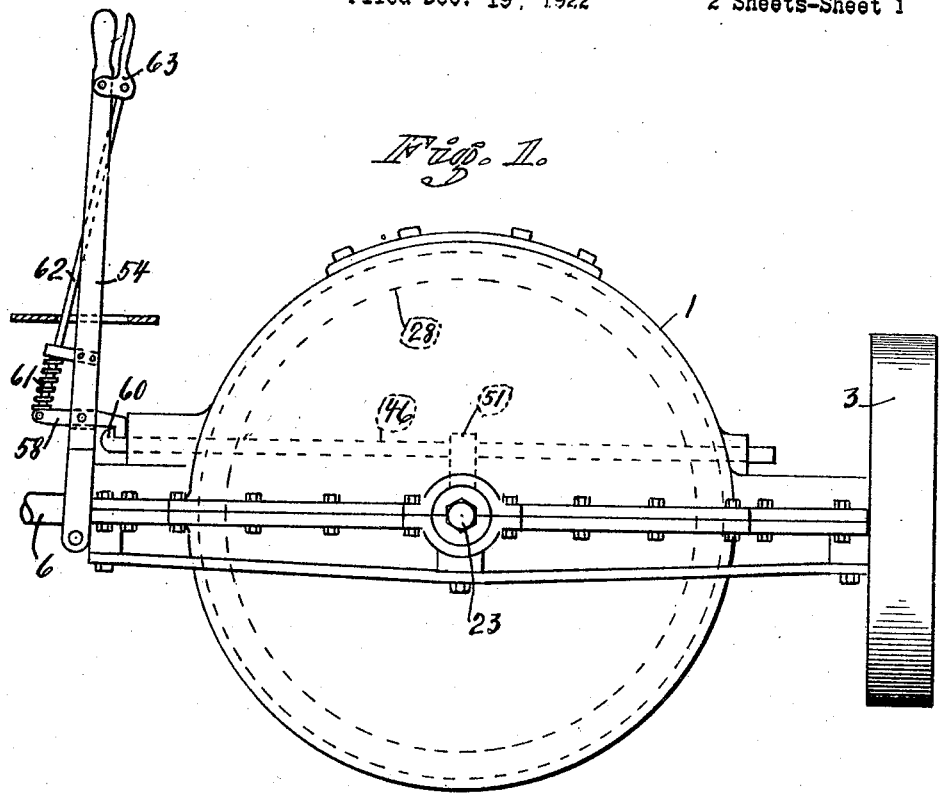
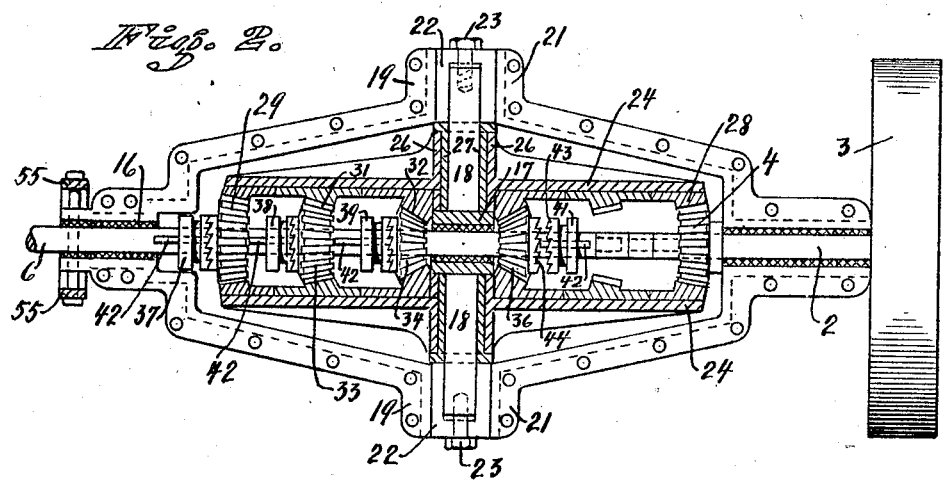
INVENTOR.
REUBEN R. WISE.
BY
ATTORNEYS.

Jan. 22, 1924.
R. R. WISE
1,481,578
CHANGE SPEED TRANSMISSION GEAR
Filed Dec. 19, 1922
2 Sheets-Sheet 2
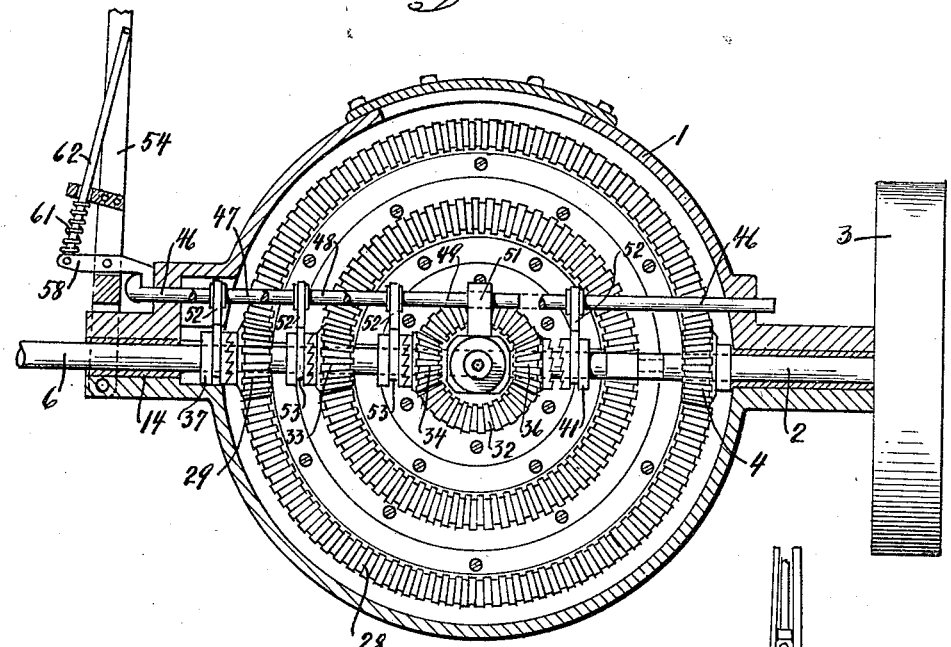
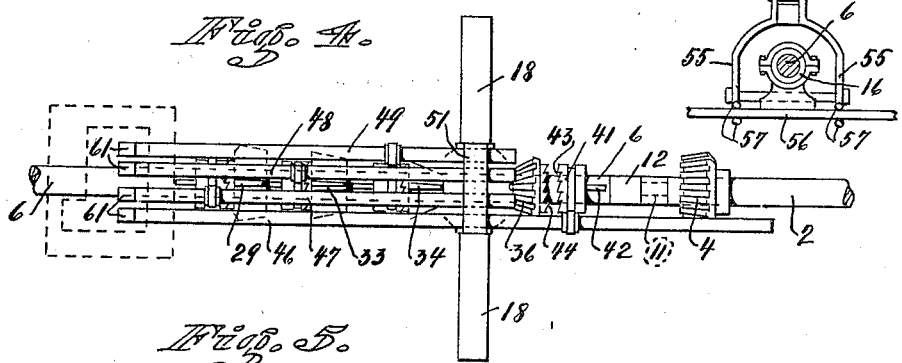
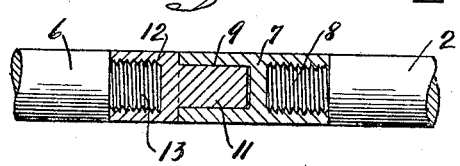
INVENTOR.
REUBEN R. WISE
BY
ATTORNEYS.

Patented Jan. 22, 1924.

1,481,578

UNITED STATES PATENT OFFICE.

REUBEN REINEE WISE, OF MANTECA, CALIFORNIA.

CHANGE-SPEED TRANSMISSION GEAR.

Application filed December 19, 1922. Serial No. 607,914.

*To all whom it may concern:*

Be it known that I, REUBEN REINEE WISE, a citizen of the United States, and a resident of Manteca, county of San Joaquin, State of California, have invented a new and useful Change-Speed Transmission Gear, of which the following is a specification.

The present invention relates to improvements in change speed transmission gears for motor vehicles and the like and its particular object is to provide a transmission gear of the character described in which the shifting from one speed to another can be accomplished without disconnecting the drive shaft from the crank shaft of the in-power plant. A further feature of the invention is that in shifting from slow speed to medium, and from medium to high speed, the mere throwing into engagement of the higher speed gear effects the release of the lower one without requiring any action on the part of the operator. It is further proposed to provide a transmission gear in which frictional losses are reduced to a minimum while the transmission is positive in action, strong and simple in construction. Further objects and advantages of the invention will appear as the specification proceeds.

The preferred form of the invention is shown in the accompanying drawings in which Figure 1 represents a side view of my transmission gear, Figure 2, an axial horizontal section through the same, Figure 3 an axial vertical section through the same, Figure 4 a top plan view of the gear shifting mechanism, Figure 5 a detail view, partly in section, of a loose coupling between two shafts and Figure 6 a detail view illustrating the operation of a shifting lever. While I have shown only the preferred form of the invention, I wish to have it understood that various changes or modifications may be made within the scope of the claims hereto attached without departing from the spirit of the invention.

The housing (1) for my transmission gear is preferably cylindrical in form with the axis of the cylinder disposed transversely to the drive shaft (2) which latter connects with the crank shaft of the engine not shown in the drawing, either directly or through the clutch (3). The latter forms no part of the invention and is, therefore, shown in side elevation only. The drive shaft extends into the housing a short distance and is provided, within the housing, with a bevel pinion (4). It should be mentioned that bevel gears are used throughout the transmission, although this is not a necessary feature of the invention, and the same should not be construed as being limited to bevel gears.

The line shaft (6), which drives the rear axle through the conventional differential gear not shown in the drawing, is supported in alinement with the drive shaft and coupled to the latter with freedom of rotary motion relative to the same. The coupling is shown in detail in Figure 5 and comprises a sleeve nut (7) threadedly engaging the reduced end (8) of the drive shaft having a cylindrical socket (9) in its far end adapted to receive a reduced extension (11) of a second nut (12) threadedly engaging the reduce end (13) of the line shaft.

The latter extends rearwardly through the housing as shown at (14), rotating in a bushing (16), and is supported in the center of the housing in a hub (17) formed in a transverse shaft (18) resting in the ends (19) of the housing which for this purpose is provided with embossments (21) and bearings (22). The position of the transverse shaft within the housing may be slightly adjusted by means of bolts (23) passing through the closed ends of the bushings (22) and threadedly engaging the ends of the transverse shaft.

Two discs (24) are supported on the transverse shaft, which latter does not rotate, on opposite sides of the line shaft (6), their hubs (26) rotating on bushings (27) interposed between the same and the transverse shaft. The discs are provided with large beveled ring gears (28) bolted to the same and engaging, on opposite sides, the pinion (4). The ring gears are caused to rotate in opposite directions by the pinion (4) and transmit rotary motion to a second beveled pinion (29) rotatably supported on the line shaft (6), causing the latter pinion to rotate at the same speed as the drive pinion, but in opposite direction.

Two other ring gears (31) and (32) are bolted to each disc in opposing relation, the gears decreasing in diameter in the succession indicated, the former transmitting rotary motion at reduced speed to a beveled pinion (33) on the line shaft and the latter at a more reduced speed to two bevel pinions (34) and (36). These two pinions are disposed on opposite sides of the transverse shaft so that one of them (34) rotates in opposite direction to that of the drive pinion while the other (36) rotates in the same direction. It will be seen that thus, when the drive pinion rotates, all the pinions on the line shaft rotate, the pinion (29) being designed to transmit crank shaft speed, the pinion (31) medium speed and the pinions (34) and (36) slow speed, the former rotating in opposite direction to that of the drive shaft and the latter in the same direction as the drive shaft.

All the pinions are loose on the line shaft and are adapted to be selectively engaged with the same by means of sleeves (37), (38), (39) and (41), which are slidable on the shaft but held against rotation on the same by keys (42). The sleeves are provided with ratchet faces (43) adapted to engage corresponding ratchet faces (44) of the pinions.

To shift the levers I provide four shift rods, (46), (47), (48) and (49) supported above the line shaft in parallel relation to the same. They extend through the rear end of the housing and are slidably supported in a block (51) formed integral with the bearing (17) on the transverse shaft. Each rod has a transverse member (52) secured thereon and the latter members are forked at their free ends so as to engage a groove (53) in one of the sleeves previously referred to.

A vertical handle (54), forked at its lower end as shown at (55), rides on a transverse rod (56) by means of rollers (57) and is provided with a horizontal lever (58), the projection (59) of which may be brought into engagement with any one of the projections (60) at the rear ends of the shift rods (46), (47), (48) and (49). Normally the lever is held out of engagement with the shift rods by the spring (61) surrounding a rod (62) connecting the rear end of the lever (58) with the fulcrum of a bell crank lever (63), one end of which is pivoted to the top of the handle (54), while the other end runs parallel to the latter. By forcing this end toward the handle and shifting the handle, the operator may engage the lever (58) with any one of the shift rods and actuate the same to bring its respective sleeve into mesh with the pinion associated therewith.

The operation of the device is as follows: Normally all the ring gears and all the pinions on the line shaft rotate, the pinion (36), which represents the reverse speed, in the same direction as the drive pinion (4), and all the other pinions in the opposite direction, at varying speeds. To effect reverse motion of the motor vehicle the driver shifts the handle (54) into a position adapted to engage the lever (58) with the shift rod (46), presses on the bell crank lever (63) to effect the engagement and pulls the handle backward whereby the ratchet face of the sleeve (41) is brought into engagement with the registering face of the pinion (36). To stop the reverse motion the handle is pushed forward so as to disengage the sleeve (41) from the pinion (36). For slow forward speed the lever (58) on the handle is made to engage the shift rod (49) when a forward push on the rod forces the sleeve (39) into engagement with the pinion (34). For medium speed the sleeve (38) is engaged in a similar manner with the pinion (33) without disengaging the slow speed sleeve from its pinion, the latter disengagement being brought about automatically as soon as the sleeve (38) begins to turn the shaft at higher speed. The engagement of the high speed sleeve (37) with its respective pinion (29) will in the same manner automatically disengage the sleeve (38) from the pinion (33) so that all changes to higher speeds may be made without disconnecting the load from the engine.

I claim:

1. A housing, a pair of duplicate multi-ring gears therein in confronting relation, a transverse shaft supported at opposite ends by the housing and rotatably supporting the multi-ring gears, an enlargement on the transverse shaft between said gears with a bore extending therethrough at right angles to the shaft, a second shaft extending through the bore and having bearing therein, and also in one end of the housing, a third shaft having bearing in the opposite end of the housing in alinement with the second shaft, a pinion on the third shaft engaging both ring gears, a plurality of loose clutch pinions on the second shaft each engaging another ring of the ring gears, and means for selectively connecting said loose pinions with said second shaft.

2. A housing, a pair of duplicate multi-ring bevel gears therein in confronting relation, a transverse shaft supported at opposite ends by the housing and rotatably supporting the multi-ring bevel gears, an enlargement on the transverse shaft between said gears with a bore extending therethrough at right angles to the shaft, a second shaft extending through the bore and having bearing therein and also in one end of the housing, a third shaft having bearing in the opposite end of the housing in alinement with the second shaft, and means embracing the ends of both latter shafts for maintaining their alignment, a bevel pinion on the third shaft engaging both ring gears, a plurality of loose clutch pinions on the second shaft each engaging another ring of the ring gears, and means for selectively connecting said loose pinions with said second shaft.

3. In a structure as defined in claim 2, said means embracing a plurality of horizontally alined clutch shifter rods, a yoked shifter lever straddling the second shaft and slidable laterally thereof with means thereon for engaging any of the rods.

REUBEN REINEE WISE.